(No Model.)
J. F. LEWIS.
SPRING WASHER.
No. 436,737. Patented Sept. 16, 1890.
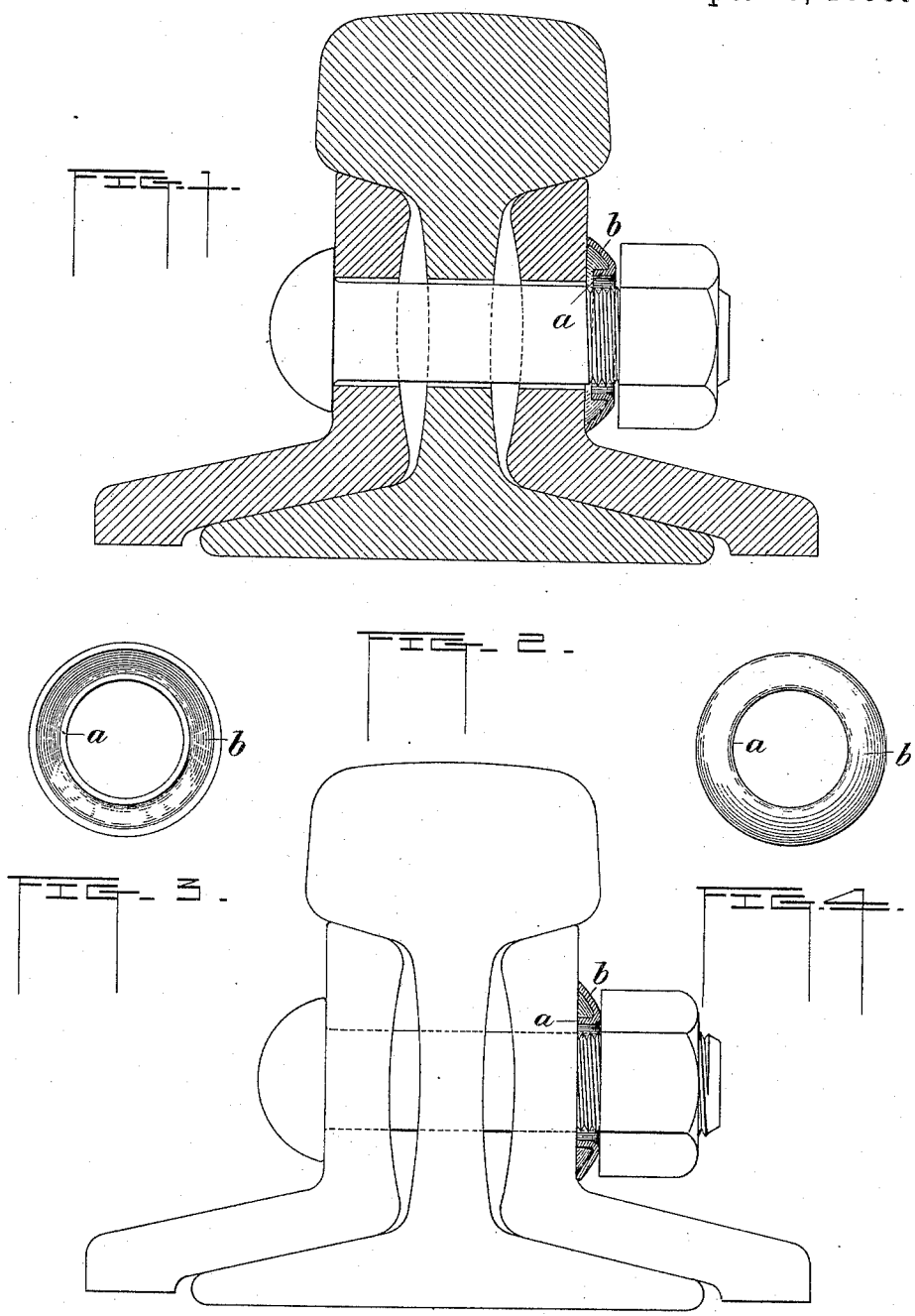
WITNESSES
INVENTOR
John F Lewis
by W. Bakewell & Sons
his Attorneys

UNITED STATES PATENT OFFICE.

JOHN F. LEWIS, OF BRADDOCK, ASSIGNOR OF TWO-THIRDS TO BARTHOLOMEW J. FOLEY, OF PITTSBURG, AND HARVEY McKINNEY, OF BRADDOCK, PENNSYLVANIA.

SPRING-WASHER.

SPECIFICATION forming part of Letters Patent No. 436,737, dated September 16, 1890.

Application filed June 4, 1890. Serial No. 354,221. (No model.)

*To all whom it may concern:*

Be it known that I, JOHN F. LEWIS, of Braddock, in the county of Allegheny and State of Pennsylvania, have invented a new and useful Improvement in Spring-Washers, of which the following is a full, clear, and exact description, reference being had to the accompanying drawings, forming part of this specification, in which—

Figure 1 is a vertical cross-section showing my improved spring-washer applied to a bolt, but before compression and locking thereof. Fig. 2 is a similar view showing the washer in a state of compression. Fig. 3 is a plan view of the inner side of the washer. Fig. 4 is a similar view of the outer side thereof.

Like symbols of reference indicate like parts in each.

My improved spring-washer consists of an annular piece of spring sheet metal, preferably steel, of the shape in cross-section shown in Fig. 1, having an inner cylindrical portion $a$ and an outer conoidal portion or flaring skirt $b$, which extends somewhat beyond the plane of the cylindrical portion. It is placed around the bolt on the inner side of the nut with the convex side outermost, and when the nut is screwed home upon it, the pressure exerted on the outer flaring skirt $b$ compresses the washer and spreads the flaring skirt, as shown in Fig. 2. This compression may be continued until the cylindrical portion $a$ engages the fish-plate or other surface against which the nut is to be screwed. By reason of the fact that the washer is made of spring metal its compression serves to jam the nut upon the bolt and to lock it thereon with great security. The function of the cylindrical portion $a$ is to strengthen the washer, and by acting as a stop to prevent it from being compressed sufficiently to break or strain the elastic skirt $b$. Without the part $a$ the washer would be too weak, and when once compressed would be apt to lose its resiliency and to be incapable of repeated use. Unless the skirt $b$ extended beyond the plane of the part $a$, the pressure exerted by screwing home the nut would be on both these parts and would exert on the washer a crushing force, which would impair its resiliency, and would also spoil its capacity for repeated use.

The advantages of the device are apparent. It is strong, easily made, and is very efficient. It may be applied to use in locking nuts on railway-rails and for other purposes where nuts are used.

I claim—

A spring-washer having an inner annular portion $a$ and a diverging elastic skirt $b$, which extends beyond the plane of the portion $a$, whereby the strain of compressing the washer is exerted first on the elastic skirt, to which the portion $b$ serves as a stop, substantially as and for the purposes described.

In testimony whereof I have hereunto set my hand this 2d day of June, A. D. 1890.

JOHN F. LEWIS.

Witnesses:
   W. B. CORWIN,
   H. M. CORWIN.